Figure 1:
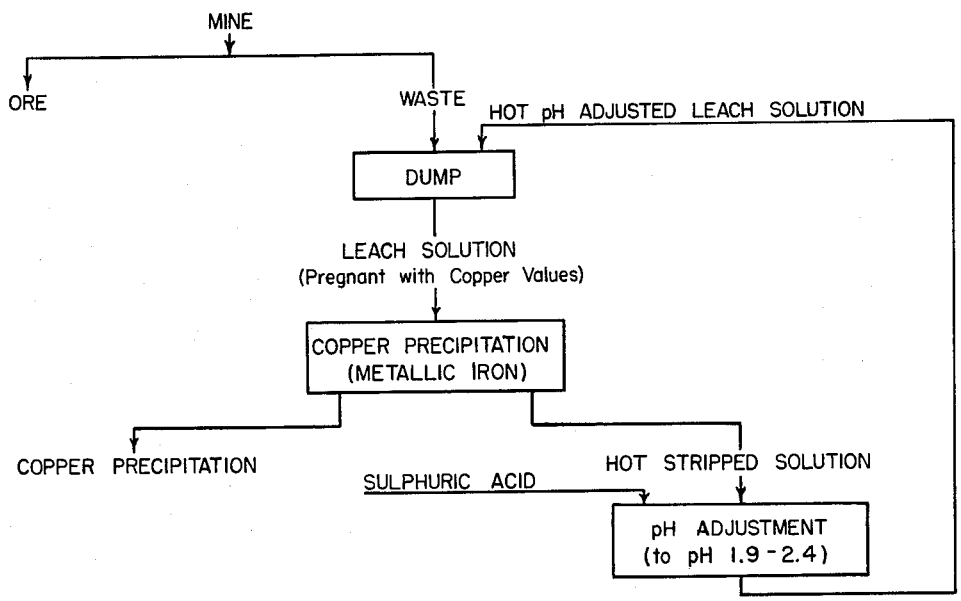

July 12, 1966  S. R. ZIMMERLEY ETAL  3,260,593
PROCESS FOR LEACHING COPPER FROM LOW-GRADE, COPPER-BEARING
ORE MATERIALS
Filed Sept. 12, 1962  2 Sheets-Sheet 1

INVENTOR.
STUART R. ZIMMERLEY
EMIL E. MALOUF
BY JOHN D. PRATER

ATTORNEYS

July 12, 1966 S. R. ZIMMERLEY ETAL 3,260,593
PROCESS FOR LEACHING COPPER FROM LOW-GRADE, COPPER-BEARING
ORE MATERIALS
Filed Sept. 12, 1962

INVENTOR.
STUART R. ZIMMERLEY
EMIL E. MALOUF
BY JOHN D. PRATER

ATTORNEYS

United States Patent Office 3,260,593
Patented July 12, 1966

3,260,593
PROCESS FOR LEACHING COPPER FROM LOW-GRADE, COPPER-BEARING ORE MATERIALS
Stuart R. Zimmerley, Emil E. Malouf, and John D. Prater, Salt Lake City, Utah, assignors to Kennecott Copper Corporation, New York, N.Y., a corporation of New York
Filed Sept. 12, 1962, Ser. No. 223,206
12 Claims. (Cl. 75—117)

This invention relates to hydrometallurgical processes for extracting copper from various low-grade, copper-bearing ore materials, such as exceptionally low-grade copper sulfide or mixed copper sulfide and copper oxide ore bodies, mine wastes, mill tailings, and various intermediate products of ore-milling procedures.

It has long been conventional practice at copper mines dealing with low-grade copper ores to run mine water over the waste dumps of ore materials too low in grade to process efficiently by presently known methods, and to recover copper from the resulting solution by precipitation on metallic iron. The leaching of copper from such ore materials is due to the presence of sulfuric acid and ferric sulfate in the mine water used as the leach solution. The ferric sulfate is reduced to ferrous sulfate by the leaching reaction. More ferrous sulfate is formed by the replacement of metallic iron with copper.

It is customary to repeatedly recycle the stripped leach solution through the ore material concerned, relying only on natural oxidation of the ferrous sulfate to supply the needed ferric sulfate. Thus, it has been recognized that some regeneration of the ferrous sulfate to ferric sulfate takes place naturally as the solution works its way down through the body of material. It is usual for the pregnant leach solution to have a pH of 2.5 on emerging from the waste dump although the pH of the stripped solution is 3.5.

Some (from 1% to 2%) of the ferrous sulfate is oxidized as the solution is passed back to the waste dump. However, under normal conditions, much of this precipitates as a basic iron sulfate in pipe lines, in flow channels on the waste dumps, and in interstices of such waste dumps themselves, thereby restricting flow of the solution and contact thereof with the copper-bearing materials. This tremendously reduces the efficiency of copper recovery.

Although it has been proposed (Scott U.S. Patent No. 2,563,623) to regenerate the stripped leach solution by aeration in a special pond under controlled conditions to change ferrous sulfate to ferric sulfate and precipitate excess iron where it will do no harm, the time and storage area required are too great for practical use in ordinary dump leaching practice. Zimmerley et al. U.S. Patent No. 2,829,964 discloses how bacteria can be usefully employed for regeneration, but also proposes the provision of a special regeneration reservoir for the purpose.

A principal object in the making of the present invention was to overcome the difficulty of pipe and flow-channel plugging by precipitated basic iron sulfate.

A further object was to regenerate the leach solution without resorting to the construction of a special regeneration reservoir and without taking the time ordinarily required for regeneration.

In the accomplishment of these objects, an outstanding feature of the invention is pH control of the leach solution following precipitation of the copper but before recirculation through the waste dump.

It has been found that the addition of sufficient mineral acid, preferably sulfuric, to such stripped leach solution to lower its pH from the normal 3.5 to a pH in the range of from about 1.9 to about 2.4 (optimum 2.1) will not only prevent the deposition of basic iron sulfate but will increase recovery of copper by about fifty percent. Moreover, if this adjusted leach solution is recirculated at a sufficiently elevated temperature, e.g. about 25° F. above ambient, which, fortunately, is a natural result of leaching with the adjusted solution, the recovery of copper is about double that obtained with the adjusted leach solution at ambient temperature.

Accordingly, another outstanding feature of this invention is the leaching with hot adjusted solution, this being advantageously accomplished by recirculating the stripped, naturally heated, leach solution substantially without diminution of temperature and with continued pH control in the range of from about 1.9 to about 2.4.

It should be noted that the heat generated by the adjusted leach solution recycled through the mineral material concerned is, as a practical matter, due entirely to the reactions of the solution on the sulfide minerals within the dump and not to the heat of dilution of the added acid.

Perhaps the most surprising thing about the results obtained by this procedure is that considerably less than the stoichiometric amount of acid necessary to account for the additional copper recovered is added to the leach solution in achieving the pH control specified.

Indications are that, by the prescribed procedure, a bacterial regeneration reservoir in accordance with the aforesaid Zimmerley et al. Patent No. 2,829,964 is formed in the upper portion of the dump itself, the required aeration being effected by natural access of air to the reservoir through interstices progressively freed of accumulated deposits of ferric sulfate. In instances where the temperature rises unduly so far as the bacteria are concerned, acceleration of the chemical leaching action more than compensates for loss of bacterial regenerating action.

In some instances it will be desirable to forcibly introduce air, oxygen-enriched air, or pure oxygen into upper portions of the dump to enhance natural aeration.

One way of doing this at minimum expense is to interrupt the supply of leach solution to a cut or pond at the top of the dump periodically and for a time sufficient for solution in the pond to pass completely into and far enough down through the dump to naturally suck an effective quantity of atmospheric air in behind it, whereupon supply of leach solution is resumed. By using two or more cuts or ponds on the dump, recycling of solution can be continuous, one or more of the ponds being used alternately to receive the recycled solution.

In the use of the present process, as contrasted with customary recirculation procedures, a single cut or pond instead of several may be employed along the top of the waste dump. This is so because recirculation takes place promptly. The pool or cut does not fill up and overflow under continuous input of recirculated leach solution. Nevertheless, as previously indicated, it may be desirable to use more than one, in order to induce flow of atmospheric air into the dump.

We have found that a pH of 2.1 is optimum in most instances. A lower pH tends to waste acid, while a higher pH tends to sacrifice recovery.

A significant advantage offered by the invention, because of the relatively rapid percolation of the recycled leach solution, is the maintaining of a substantially constant copper content in the pregnant solution fed to the precipitation plant by exercising control over the quantity of leach solution recycled onto both new and old areas of a dump.

Figure 2:
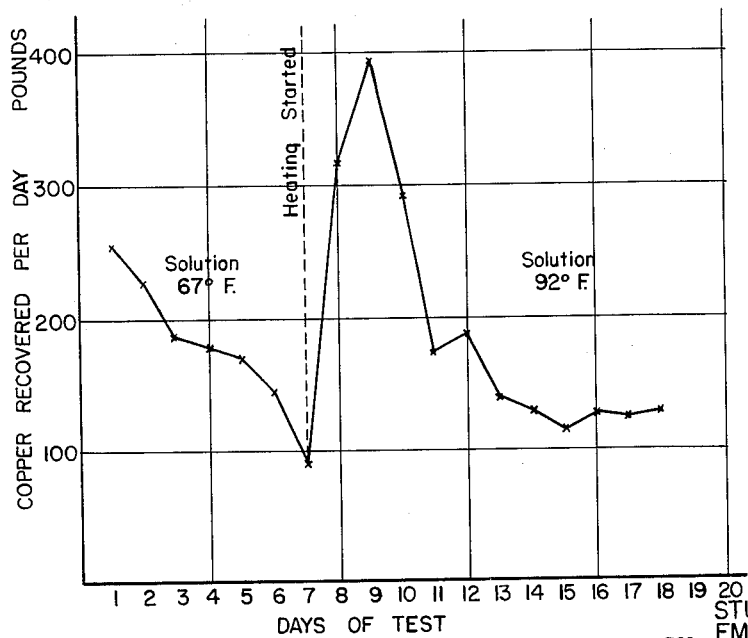
Figure 3:
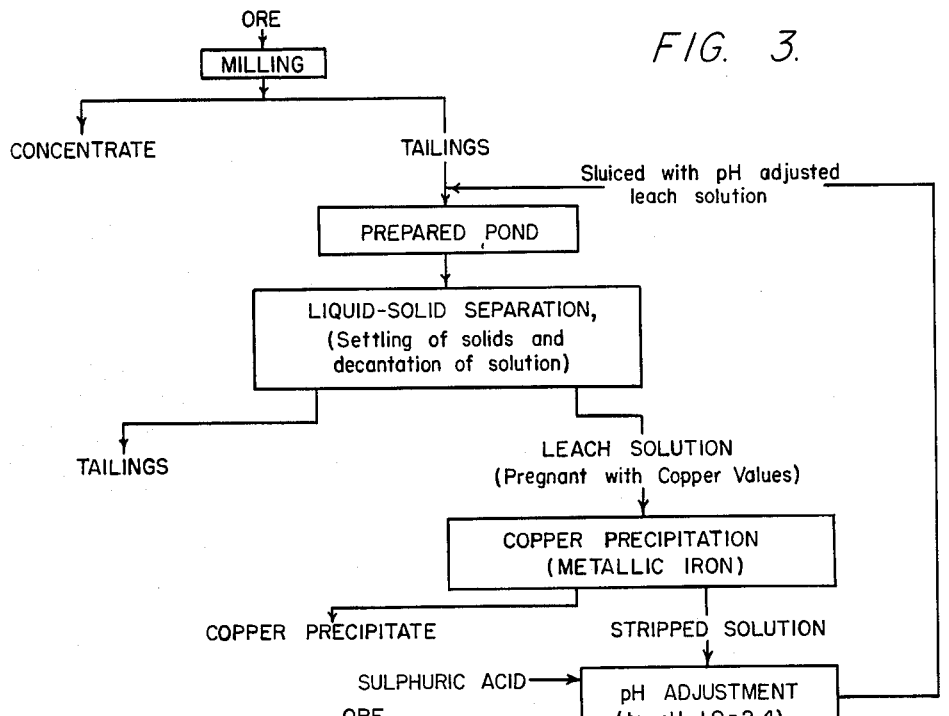
Figure 4:
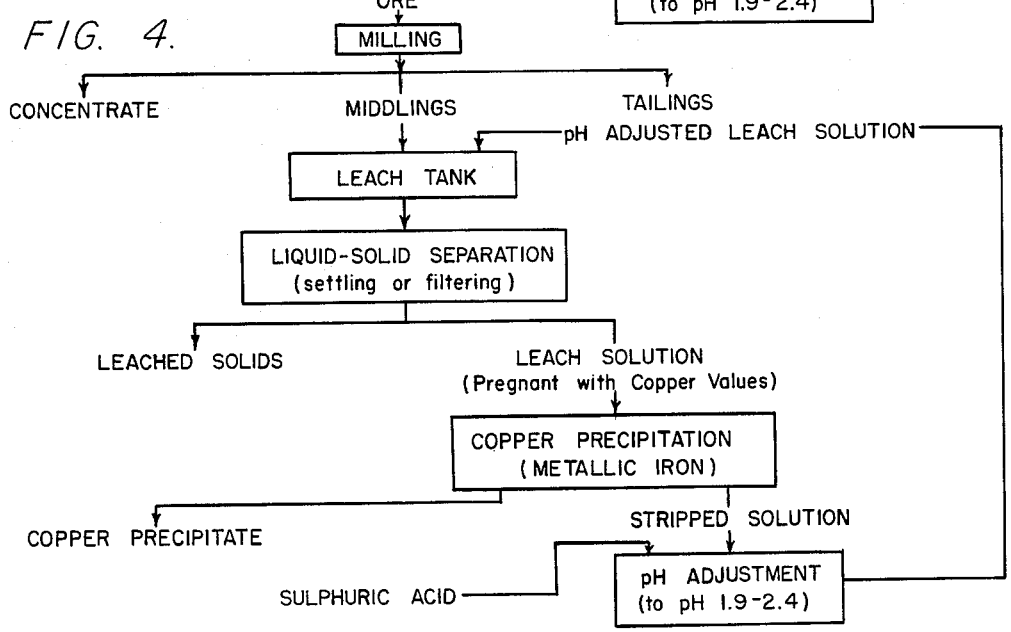

Specific procedures presently regarded as the best modes of applying the process of the invention in particular instances are described in detail hereinafter in connection with the accompanying drawings, in which:

FIG. 1 is a flow sheet illustrating an application of the process to a waste ore dump;

FIG. 2, a graph indicating the advantage in recirculating the leach solution while hot;

FIG. 3, a flow sheet illustrating an application of the process to mill tailings; and FIG. 4, a flow sheet illustrating an application of the process to a middling product.

Referring to the drawings:

As indicated in FIG. 1, when the process is applied to a waste ore dump, the recirculated leach solution is passed into and through the ore dump in essentially customary manner, except for control of pH of such solution and the fact that there is substantially no delay in recirculation, as necessarily occurs in instances where there is special regeneration of the stripped and spent solution following the usual precipitation of copper on metallic iron.

It is common practice to prepare a mine waste dump for leaching by selecting a site for the dumping of mine waste such that natural drainage of leach solution applied at the top of the dump occurs by means of gravity percolation of such solution through the interstices of the waste ore material in the dump and such that collection of the solution at the bottom of the dump can be conveniently carried out. Although it is customary to make several ponds at the top of the dump for reception of initially applied and recirculated solution, a single cut or pond can be employed in the present instance, because gravity flow of the solution therefrom into and through the dump is exceptionally rapid.

The loaded or pregnant leach solution resulting from percolation through the dump is passed over metallic iron in any suitable manner to accomplish the usual replacement of metallic iron by metallic copper, yielding a copper precipitate which is the desired product. In accordance with the invention, the stripped solution is adjusted or conditioned by the addition thereto of sufficient mineral acid, preferably sulfuric, because of its availability and low cost, to lower the pH of such solution from the normal of about 3.5 to within the range of about 1.9 to about 2.4 and preferably 2.1, whereupon the adjusted solution is recycled.

This recycling of the solution, following adjusting as indicated, will yield about 50% more copper than would be recovered had the solution been recycled without such adjusting. When it is realized that the amount of acid added to the stripped and spent leach solution is only about one-third the stoichiometric amount required were the increase to be accounted for by the dissolving action of such acid on the copper minerals concerned, the importance of this adjusting step becomes clear.

In applying the invention to a typical waste dump of a large copper mine in the Western part of the United States, which dump exceeds 400 feet in depth and contains about 0.12% copper, of which about 0.08% is in the form of sulfide minerals, primarily chalcopyrite with some chalcocite, covellite, and bornite, and only about 0.04% is is the form of oxide minerals, the leach solution, adjusted to a pH of 2.1 before passage through the dump and having a temperature of about 85° F., contained eight to ten pounds of copper per 1000 gallons and had a temperature of about 110° F. when it emerged from the bottom of the dump. Operating records showed that, without such adjusting of the leach solution, the emerging pregnant solution contained only five to six pounds of copper per 1000 gallons and had a temperature of only about 90° F.

Follow-up work in the laboratory indicated that use of the adjusted leach solution, as heated to abnormal extent by the leaching operation, would yield a still greater recovery than use of the adjusted solution at ambient temperature. Accordingly, a relatively small experimental dump (50 feet deep and broad enough to accommodate a 50 feet x 50 feet leach pond) was provided at the mine for large scale tests under controlled conditions. This dump was treated for a period of seven days with an adjusted and readjusted solution whose temperature was 67° F. and for the following eleven days with the same solution at a temperature of 92° F. The results are graphically shown in FIG. 2, which is based on the following table of recorded data:

*Leach solution 67° F.*

| Day: | Pounds of copper leached |
|---|---|
| 1st | 254 |
| 2nd | 225 |
| 3rd | 188 |
| 4th | 179 |
| 5th | 169 |
| 6th | 141 |
| 7th | 94 |

*Leach solution 92° F.*

| Day: | Pounds of copper leached |
|---|---|
| 8th | 320 |
| 9th | 397 |
| 10th | 292 |
| 11th | 173 |
| 12th | 188 |
| 13th | 141 |
| 14th | 132 |
| 15th | 113 |
| 16th | 132 |
| 17th | 124 |
| 18th | 134 |

Due to conditions at the experimental site and to the winter season, it was impossible to prevent the leach solution from cooling as it emerged from the dump. Thus, the leach solution was cooled to ambient temperature between leaching periods and, for the first seven days, had practically the same temperature each time it was recycled through the dump. After the seventh day, the readjusted solution was heated to 92° F. prior to each recycling through the dump. Core drilling had established the fact that this was substantially the temperature of the solution within the dump and before cooling following emergence therefrom.

The startling results shown by both the table and the graph are indicative of the usefulness of this aspect of the invention.

As previously indicated, in actual dump-leaching practice of the invention on full-scale dumps having depths of at least 400 feet, the adjusted leach solution naturally achieves and maintains a temperature differential of about 25° F. over what is normal in the conventional practice of permitting the only slightly heated leach solution to be cooled prior to being recycled.

The procedure and equipment involved in maintaining the adjusted leach solution at substantially the elevated temperature acquired by passage through the dump will, of course, vary considerably, depending upon conditions at the particular installation. If the precipitation process and apparatus disclosed in copending application Serial Number 181,001, filed March 20, 1962 by Back et al. are utilized, very little drop in temperature will occur during the precipitation stage. Where necessary, due to low ambient temperatures, heat-insulated piping is utilized for recycling the solution from precipitation to the dump and from the dump to precipitation.

In some instances, e.g. where conserving heat during the precipitation stage is impractical, it may be found desirable to divide the hot, pregnant, leach solution emerging from the dump and recycle part to the dump unstripped.

A typical application of the invention to mill tailings is shown in FIG. 3, where leaching is carried out in a prepared tailings pond into which tailings are discharged from the milling operation and into which the adjusted leach solution is passed. Slurry from the pond is passed to suitable apparatus, such as a thickener, or to another pond for settling of solids and withdrawal of the leach solution pregnant with copper values. Precipitation of copper and adjusting and recycling of the stripped leach solution are carried out in essentially the same manner as in the instance of a waste dump.

In FIG. 4 is shown an application of the invention to a middling product of ore milling. The middlings are passed into a leach tank and the resulting slurry into a suitable settling tank or through a filter, to separate solids from the pregnant leach solution. Copper is precipitated from such solution and the stripped solution is adjusted and recycled as in the previous instances.

In the leaching of such metallurgical materials as mill tailings and middlings, as well as relatively shallow waste dumps and low-grade ore bodies, where temperature rise is dissipated during the leaching operation, significantly increased recoveries can be obtained by artificially heating the stripped solution prior to recycling of readjusted solution. Whether or not such heating is practiced and the extent of same will depend upon economics in any given instance. Thus, the cost of heating must be less than the value of the additional copper recovered if useful results are to be achieved.

As indicated previously, sulfuric acid will normally be employed in preference to other mineral acids for the purpose of lowering the pH of the stripped solution prior to recycling. It can be said in general that one gallon of concentrated sulfuric acid (98%) per 1000 gallons of the stripped leach solution will normally be adequate to effect the desired pH adjustment.

In deep dump leaching (approximately 400 feet or more), a bacterial regeneration reservoir or zone can be expected to form within the first fifty to one hundred feet under the influence of natural aeration from the surface. As previously indicated, aeration can be enhanced by forced introduction of air, oxygen-enriched air, or pure oxygen into this zone through lances driven down from the surface, or by the induction of atmospheric air. Although the heated leach solution is recycled substantially without diminuation of its acquired heat, there will be some cooling in this initial zone. Should the temperature become so excessive as to destroy the bacteria, accelerated chemical leaching action will more than compensate.

In a forty-five day test on a major waste dump, flow of adjusted and recycled leach solution was alternated between two cuts or ponds established 400 feet apart to determine the efficacy of the induction of atmospheric air into the regeneration zone. As a result, an additional 2200 pounds of copper (10%) were recovered each day in comparison with an adjacent area where similarly adjusted and recycled leach solution was passed continuously to a single cut or pond.

It should be realized that the pregnant leach solution emerging from the dump or other body of material being leached will have the normal pH, i.e. about 2.5, and that the stripped solution emerging from the precipitation plant will also have the normal pH, i.e. about 3.5, despite the lowering of the pH of the stripped solution in accordance with the foregoing teaching prior to recycling it through the material concerned. The adjusted solution recycled to such material will contain only about 2 to 4 grams of iron per liter, all told, depending upon the grade of the material being leached. We have found from laboratory tests that more than 2 grams per liter of iron in the leach solution is not necessary and it is well recognized that excessive amounts are undesirable.

Low-grade copper-bearing ores are ordinarily those containing not more than 1% copper, although the term can be appropriately and is here used to apply to those ores containing not more than 2% copper. Metallurgical materials derived therefrom, such as the middlings from a flotation milling operation, can range from about 0.5% up to as high as 20% copper. Although the present process will find its greatest usefulness as applied to low-grade materials, there is no reason why it cannot be applied to higher grade materials provided that an electrowinning step precede copper precipitation with iron in order to remove excess copper from the leach solution. Both these procedures for removing copper from the leach solution are based on ion replacement.

Most metallurgical materials that are ordinarily subjected to leaching are of a highly siliceous character and are low in acid-consuming ingredients, such as lime. The invention is not limited in its application, however, to these materials. Metallurgical materials high in acid-consuming constituents are also susceptible of successful treatment. With such materials, it is usually necessary to recycle the adjusted and readjusted leach solution for extended periods of time before any substantial recoveries will be obtained. This unproductive recycling will nevertheless ultimately produce worthwhile recoveries of copper, because the acid-consuming constituents will be gradually eliminated.

Although the range of pH adjustment of the stripped and spent leach solution has been set hereinabove at about 1.9 to about 2.4, the upper range can be extended to 2.8 without losing all benefits. Thus, between a pH of about 2.4 to about 2.8 there will be no precipitation of basic iron sulfate from the leach solution and a greater throughput of such leach solution can be carried out than is normal in conventional leaching practice. On the other hand, no effective elimination of flow-passage clogging accumulations of precipitated basic iron sulfate can be expected at these higher pH's, nor will there be unusual recoveries of copper which are not attributable solely to the increased throughput. Below a pH of about 1.9, the amount of acid required for the adjustment makes any additional copper recovery uneconomical.

Long continued recycling of leach solution will, despite the pH adjustment, tend to build up the content of the ferrous and ferric sulfates to such an extent that they may precipitate regardless of their respective solubilities. Any such precipitation will be of little consequence, however, for it will have a distribution vertically throughout the material being leached and will not form an impervious layer which seals such material against continued leaching.

Whereas there are here illustrated and described certain procedures which are presently regarded as the best modes of carrying out the invention, it should be understood that various changes may be made without departing from the inventive concepts particularly pointed out and distinctly claimed herebelow.

We claim:

1. A process for leaching copper from dumps of mine waste and from other beds of broken copper-sulfide-bearing ore materials which provide natural drainage from top to bottom thereof, comprising flowing a leach solution of ferric sulfate and a mineral acid through such a bed from top to bottom thereof such that copper values are dissolved and the pH of the solution becomes about 2.5;

contacting metallic iron with the resulting copper-bearing leach solution to strip copper therefrom by replacing iron with copper;

adjusting the pH of the stripped leach solution to between about 1.9 and about 2.8 by the addition of a mineral acid thereto;

recycling the adjusted leach solution at said pH through said bed to establish and maintain, at least in the upper portion of the bed, optimum conditions for continuous bacterial regeneration;

and forcing oxygen into the upper portion of the bed.

2. The process of claim 1, wherein the oxygen is contained in atmospheric air, and such atmospheric air is induced into the bed by alternating the recycled leach solution between at least two separate areas on such bed.

3. A leaching process for recovering copper from copper-sulfide-bearing ore materials, comprising bringing an acidic, iron sulfate leach solution, wherein the iron is predominantly in ferrous form and whose pH is between about 1.9 and about 2.8, into leaching contact with a mass of the material to be leached under conditions such that ferrous sulfate is changed to ferric sulfate by bacterial regeneration within said mass of material and copper values are dissolved, with the pH of the solution becoming about 2.5;

recovering the resulting copper-bearing leach solution from said mass of material;

stripping substantially all the copper from the recovered solution;

adding sufficient mineral acid to the barren leach solution to adjust its pH to a value between about 1.9 and about 2.8; and bringing the so-adjusted leach solution into renewed contact with said mass of material in a recycling procedure.

4. A process in accordance with claim 3, wherein the pH of the stripped solution is adjusted to between about 1.9 and about 2.4.

5. A process in accordance with claim 4, wherein the mass of material to be leached is a bed of broken copper-sulfide-bearing ore materials having flow channels therethrough containing deposits of basic iron sulfate.

6. A process in accordance with claim 3, wherein the pH of the stripped solution is adjusted to substantially 2.1.

7. A process in accordance with claim 3, wherein the leach solution is stripped, adjusted, and continually recycled substantially without diminution of temperature.

8. A process in accordance with claim 3, wherein the mineral acid is sulfuric acid.

9. A process in accordance with claim 3, wherein stripping of copper from the copper-bearing leach solution is carried out by contacting metallic iron with said solution.

10. A process in accordance with claim 3, wherein stripping of copper from the copper-bearing leach solution is carried out by first partially stripping by electrolytic deposition and by then completing the stripping by contacting metallic iron with the partially stripped solution.

11. A process in accordance with claim 3, wherein oxygen is forced into the mass of material to be leached.

12. A process in accordance with claim 11, wherein the mass of material is a waste dump and the oxygen is in the form of atmospheric air which is induced into the bed by alternating the recycled leach solution between at least two separate application areas on such bed.

References Cited by the Examiner

UNITED STATES PATENTS

| | | | |
|---|---|---|---|
| 1,075,093 | 10/1913 | David | 75—109 |
| 1,395,755 | 11/1921 | Bragg | 75—11 |
| 2,130,278 | 9/1938 | Keyes | 75—109 |
| 2,563,623 | 8/1951 | Scott | 75—117 |
| 2,829,964 | 4/1958 | Zimmerley | 210—1 |

OTHER REFERENCES

Butts: Copper, Reinhold Publishing Corp., New York 1959, page 315.

HYLAND BIZOT, *Primary Examiner.*

WINSTON A. DOUGLAS, BENJAMIN HENKIN, DAVID L. RECK, *Examiners.*

H. W. CUMMINGS, N. F. MARKVA,
*Assistant Examiners.*